Aug. 16, 1960
C W. MUSSER
2,949,330
POST LANDING PARACHUTE RELEASE
Filed March 11, 1958
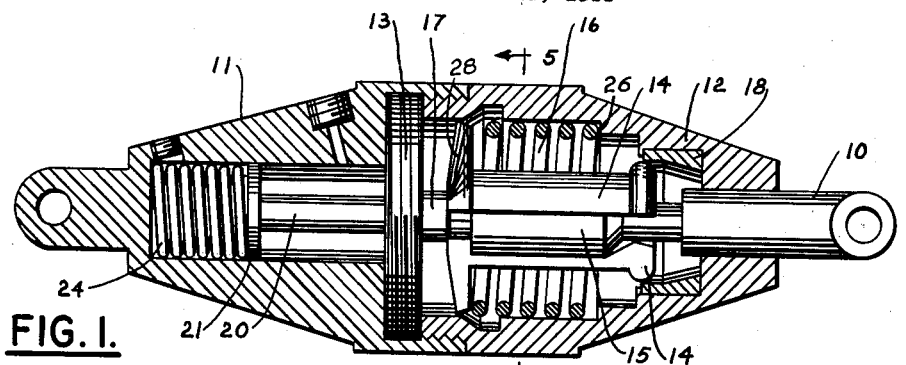
FIG. 1.
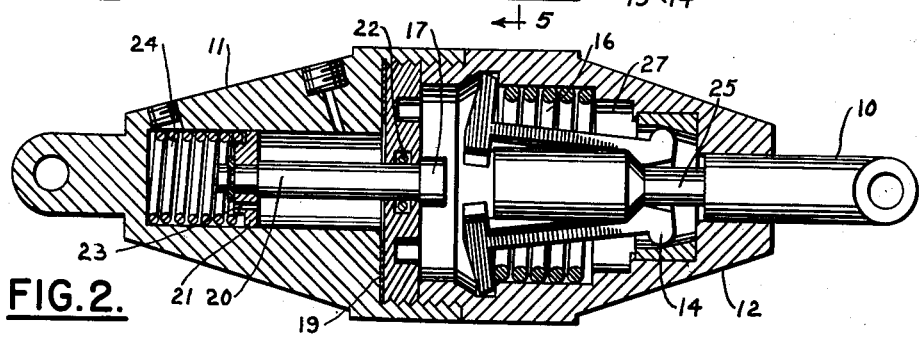
FIG. 2.
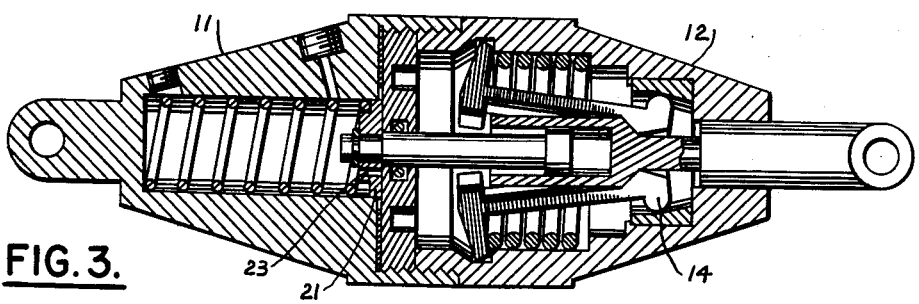
FIG. 3.
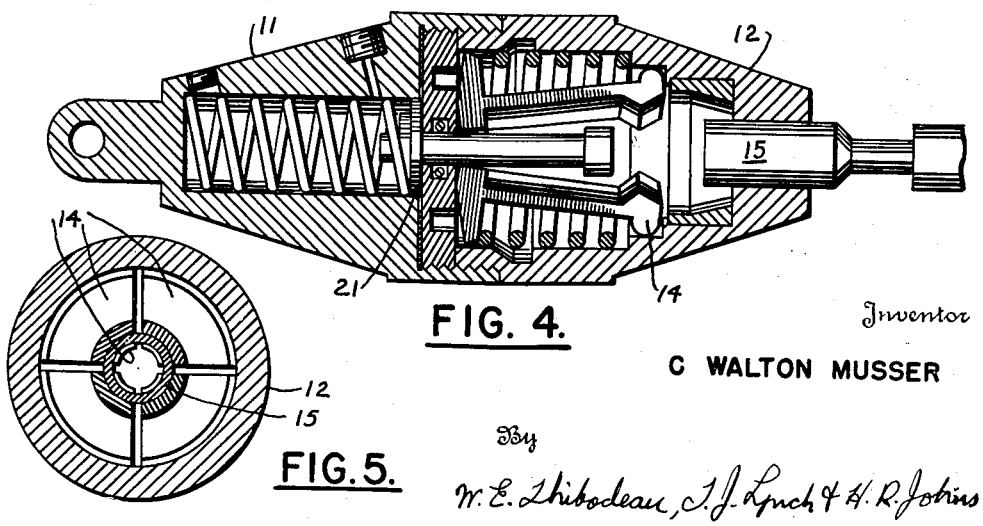
FIG. 4.
FIG. 5.
Inventor
C WALTON MUSSER
By W. E. Thibodeau, J. J. Lynch & H. R. Johns

United States Patent Office 2,949,330
Patented Aug. 16, 1960

2,949,330

POST LANDING PARACHUTE RELEASE

C Walton Musser, Beverly, Mass., assignor to the United States of America as represented by the Secretary of the Army Filed Mar. 11, 1958, Ser. No. 720,803

2 Claims. (Cl. 294—83)

(Granted under Title 35, U.S. Code (1952), sec. 266)

The invention described herein may be manufactured and used by or for the Government for governmental purposes without the payment of any royalty thereon.

This invention relates to a parachute release coupling, and more particularly to a parachute release coupling which is an improvement on that disclosed by a copending application of Albert M. Stott and C Walton Musser, Serial No. 550,227, filed November 30, 1955, for "Releasable Coupling" and issued on June 6, 1958, as Patent 2,837,370.

The releasable coupling disclosed by the aforesaid application is designed to prevent premature release of a load from a parachute. It involves an arrangement wherein fixed and movable members are locked together by means of segmented jaws which function to release the movable member in response to a decrease in the pull applied to it and at a predetermined time after the occurrence of such decrease, said delay being provided to insure against the release of the load in response to transient variations in the pull exerted on the movable member.

The present invention provides a stronger and less complicated locking means in the form of segmental jaws which are arranged to engage the outer circumference of the movable member thus providing a more sturdy structure and insuring more reliable operation of the device.

The invention will be better understood from the following description when considered in connection with the accompanying drawings and its scope is indicated by the appended claims.

Referring to the drawings:

Fig. 1 illustrates the standby condition of the coupling,

Fig. 2 illustrates the coupling as having a load applied to its movable member,

Fig. 3 shows the coupling as in a condition where the load is about to be released, Fig. 4 shows the condition of the coupling after the load is released, and Fig. 5 is a section taken on the line 5—5 of Fig. 1.

The coupling depicted by these figures includes a movable load member 10 and a fixed casing member consisting of parts 11 and 12 which are threaded together to form an enclosure having a partition 13 intermediate its ends.

To the right of the partition 13 are a plurality of segmental jaws 14 which are arranged to engage the outside of a cylindrically shaped extension 15 of the movable member 10 and are surrounded by a spring 16 which urges them inwardly toward a position where they are released from the extension 15. In the standby condition of the coupling illustrated by Fig. 1, the spring 16 is somewhat compressed by engagement of the inner ends of the jaws with an enlarged abutment member 17. In this position of the jaws 14, their outer ends are held in engagement with the extension 15, by a collar 18, the sloping inner surface of which engages the forward ends of the jaws.

The partition 13 is threaded into the end of member 11 against a sealing washer 19 and is perforated at its center to receive a piston rod 20 which has at one end the member 17 and is fixed at its other end to a piston 21, a sealing ring 22 being interposed between the partition 13 and the rod 20. The cylindrical enclosure formed by the member 11 and the partition 13 contains a buffer material such as silicone grease and the piston 21 is urged inwardly by a spring 24 which is somewhat weaker than the spring 16 so that the enlarged end 17 of the rod 20 is held against the partition 13 when no pull is applied to the movable member 10.

When the pull of a load is applied to the movable member 10, the spring 16 is compressed and the jaws 14 assume the position indicated by Fig. 2. With the jaws in this position and in the absence of the member 17, any temporary decrease in the pull of the load might inadvertently release the load in midair. This is prevented by the member 17 until it has moved outwardly beyond the inner projections at the inner ends of the jaws. The time required for this movement of the member 17 is determined by the viscosity of the silicone grease in the cylinder of the part 11 and the size of the opening 23 in the piston 21 through which the grease must pass as the piston moves from the position indicated in Figs. 1 and 2 to the position indicated by Figs. 3 and 4. With the jaws 14 in the standby condition shown in Fig. 1, the buffer fluid or silicone grease is not under compression from spring 24 because the abutment member 17 transmits the stress spring 24 to the jaws 14 held by the stronger spring 16 against partition 13. Between the extensions 15 and load member 10 is a groove 25 illustrated into which the forward ends of jaws 14 are moved in both the standby and in the load carrying position by the radially inward taper to the inner surface of collar 18. After the abutment member 17 has been moved far enough forward by spring 24 to be received within cylindrical extension 15 and clear of the forward surfaces of the radially inwardly extending rear extensions 28 of jaws 14, then any release of load enables spring 16 to move jaws 14 rearwardly, engage partition 13 and tilt the forward ends of these jaws open to a load release position shown in Fig. 4. As the load carrying member 10 is moved from its standby position in Fig. 1 to its load carrying position in Fig. 2, the jaw forward ends 14 are moved further into said groove 25 compressing spring 16 still further. However the load stress is not borne by spring 16 because that stress is transmitted from member 10 to a rear side of groove 25 thence through jaws to the radially outwardly extending portions 28 of the jaw rear ends and then transmitted to the casing member as shown in Fig. 2. A shoulder 26 is the portion of the casing member against which spring 16 abuts. A casing member groove 27 receives the forward jaw ends when they are expanded in the load release position.

I claim:

1. A parachute release connection comprising a casing member, a load carrying member slidable within said casing and having a peripheral groove, said load carrying member being slidable, and expansible segmental jaws having their forward ends extending into said peripheral groove for holding said load member in a load carrying position, a collar in said casing having a radially inwardly and longitudinally outwardly tapered inner surface for holding the forward ends of said jaws engaged in said peripheral groove, an abutment member movable in said casing member, a partition in said casing member, a piston slidable in said casing member in rear of said partition, a piston rod extending forwardly from said piston through said partition and connected to said abutment member for moving it, radial inward and outward extensions on rear end portions of said jaws, a spring within said casing member radially outside said jaws cooperating with said casing member and with said radially outwardly extending jaw rear end portions whereby said spring is partially compressed when said jaws and load member are in a standby position, said spring holding said jaws against said abutment member and said abutment member against said partition when said jaws and load member are in a standby position, said spring being further compressed by said jaws on the application of load to said load carrying member and jaws as said load member and jaws are moved outwardly and the forward end portions of said jaws are moved further into said groove by said collar, the rear ends of said jaws being radially outwardly moved about a rear edge portion of said groove as the forward jaw ends are moved into said groove by said collar, the rear ends of the jaws being opened to enable forward movement of the abutment member radially within said jaws, a second spring cooperating with said casing member and with said piston for moving said abutment member forwardly into said jaws after their rear ends have opened, a buffer cylinder within a rear portion of said casing member within which said piston may slide as a buffer, a fluid in said cylinder, a forward end of said cylinder being closed by said partition, said cylinder being provided with a fluid egress passageway whereby the timing of said abutment member's forward movement is delayed, the size of said abutment member being such as to preclude the forward ends of said jaws being opened to release said load member until after the abutment member has been moved forward of the radially inwardly extending portions of the jaw rear ends, whereby a release of load enables the first mentioned spring to move the jaws against the said partition and tilt the jaw forward ends about an intermediate portion of the jaw rear ends as a pivot when contiguous to said partition.

2. A connection according to claim 1 in which said load carrying member is provided with a hollow cylindrical rear end open rearwardly for insertion of said abutment member into said cylindrical rear end, said casing member inner surface having a groove into which the radially outwardly extending portions of said jaws may be expanded to transmit stress from the load carrying member and the rear side of said peripheral groove to said jaws and from the outer ends of said radially outwardly extending jaw rear ends to a forward wall of said casing member groove, said casing member being in two parts threaded together adjacent said partition.

References Cited in the file of this patent

UNITED STATES PATENTS

| | | |
|---|---|---|
| 2,424,215 | Anderson | July 22, 1947 |
| 2,534,704 | Frieder et al. | Dec. 19, 1950 |
| 2,613,961 | Westcott | Oct. 14, 1952 |
| 2,652,281 | Hunt et al. | Sept. 15, 1953 |
| 2,682,425 | Staats | June 29, 1954 |
| 2,729,495 | Dejean | Jan. 3, 1956 |
| 2,803,488 | Le Bus | Aug. 20, 1957 |